Dec. 21, 1943. G. V. JOHNSON 2,337,109
INDUSTRIAL TRUCK
Filed Sept. 28, 1942 3 Sheets-Sheet 1
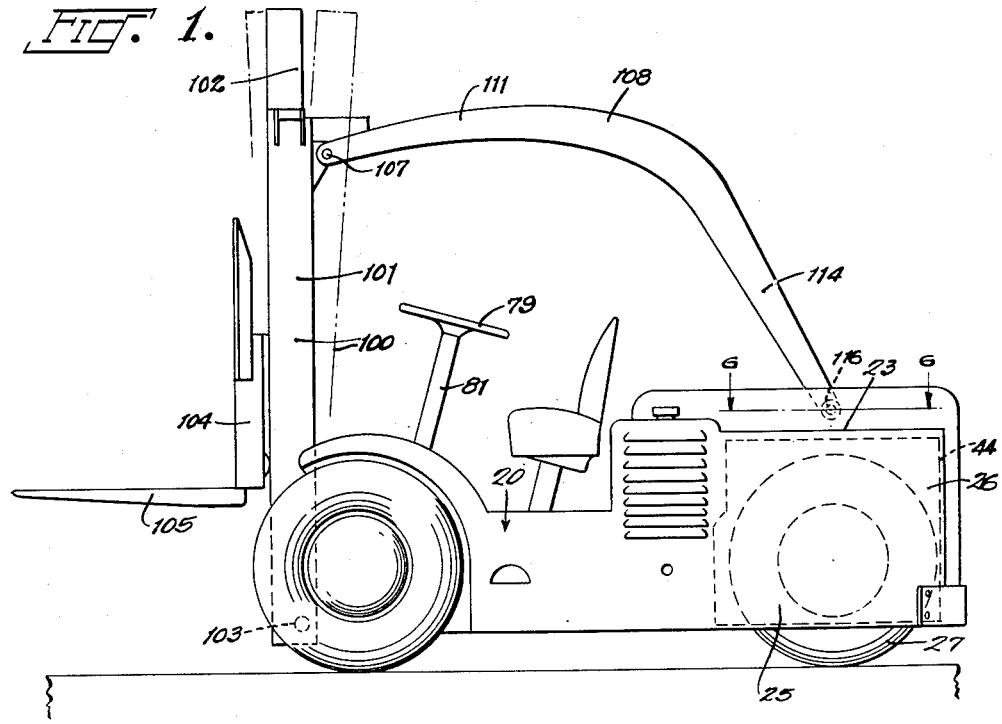
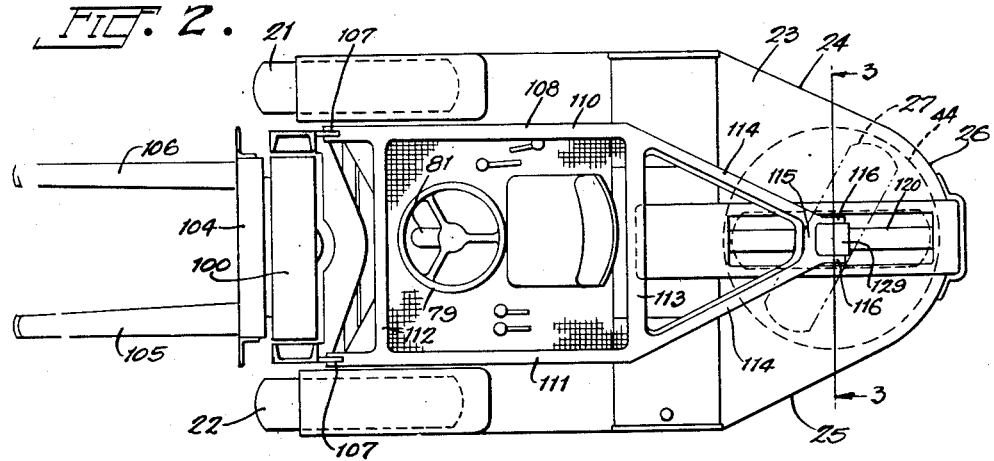
INVENTOR
George V. Johnson,
BY
ATTORNEY.

Dec. 21, 1943.  G. V. JOHNSON  2,337,109
INDUSTRIAL TRUCK
Filed Sept. 28, 1942  3 Sheets-Sheet 2

INVENTOR
George V. Johnson,
BY
ATTORNEY.

Dec. 21, 1943.     G. V. JOHNSON     2,337,109
INDUSTRIAL TRUCK
Filed Sept. 28, 1942     3 Sheets-Sheet 3

INVENTOR
George V. Johnson,
BY McCaleb, Shull & Dickinson
ATTORNEY.

Patented Dec. 21, 1943

2,337,109

UNITED STATES PATENT OFFICE 2,337,109

INDUSTRIAL TRUCK

George V. Johnson, Portland, Oreg., assignor to Willamette Hyster Company, Portland, Oreg., a corporation of Oregon Application September 28, 1942, Serial No. 459,905

20 Claims. (Cl. 214—113)

The present invention relates to industrial trucks, and is particularly concerned with that type of industrial truck comprising an automotive vehicle having a generally upwardly extending vertical frame at one end provided with lifting arms adapted to be used for lifting, moving, and stacking various types of merchandise.

The present application relates to an improvement in the invention covered by my prior application Serial No. 427,347, filed January 19, 1942, for Industrial trucks.

In the industrial trucks of this type of the prior art it has been necessary to provide a counterbalance at the end of the truck opposite to the lifting arms, and the counterbalance has comprised one or more containers which may be filled with scrap metal or other relatively heavy material or fixed cast iron weights.

One of the objects of the present invention is the provision of an improved construction in which the industrial truck is counterbalanced by its own weight and in which the counterbalancing member is adapted to be used as a trunnion or bearing frame for supporting the steering wheel, thus reducing the outside over-all dimensions to an absolute minimum. Particularly when pneumatic tires are used, which have a large outside diameter and section, this construction uses the rotative space which the steering wheel or wheels would ordinarily require when making a turn, and this space would otherwise be wasted. Without this design, the back end of the truck would be so large that it could not be used in many tight places.

Another object of the invention is the provision of an improved steering wheel support adapted to counterbalance the truck and which is nevertheless easily taken apart and easily reassembled and in which the rear structure is kept very low in order to improve visibility and to keep the center of gravity low.

Another object of the invention is the provision of an improved steering wheel supporting structure for industrial trucks of the class described which gives the truck increased stability and rigidity against tipping or tilting.

In the industrial trucks of the class described of the prior art, the upwardly extending load supporting frame has been mounted for tilting about a horizontal axis located at the lower end of the frame and such frames have been of a telescopic structure in order that the frame may be low enough when collapsed to be used indoors or in freight cars without limiting unduly the height to which loads may be lifted or stacked.

These industrial trucks of the prior art of which I am aware have their tilting frames actuated by power driven devices pivotally connected to the tilting frame near the lower end of the frame with the result that a small amount of movement of the actuating mechanism produced a wide pivotal movement of the upper end of the frame and any looseness of the parts would tend to cause swaying or swinging of the load.

Another object of the invention is the provision of an improved tilting frame structure for supporting such loads in which the actuating mechanism for tilting the frame is connected to the upper part of the frame and directly connected to a hydraulic piston having its cylinder located at the other end of the vehicle so that stresses are reduced in the connecting mechanism and the mechanism is capable of better and more sensitive control.

Another object of the invention is the provision of an improved tilting mechanism for the load supporting frame of such an industrial truck which is so arranged that it passes over the head of the operator and is of sufficient width so that it may serve as a support for a screen which is adapted to perform the function of a safety guard preventing the falling of any part of the load on the operator.

Another object of the invention is the provision of an improved tilting mechanism for the supporting frame of an industrial truck of the class described, which is simpler and more effective and which is adapted to be manufactured at a lower cost by virtue of the elimination of many parts previously considered necessary in the trucks of the prior art.

Other objects and advantages of the invention will be apparent from the following description and the accompanying drawings, in which similar characters of reference indicate similar parts throughout the several views.

Referring to the drawings, of which there are three sheets,

Fig. 1 is a vertical elevational view of an industrial truck embodying the invention;

Fig. 2 is a top plan view of the truck of Fig. 1;

Figure 3:
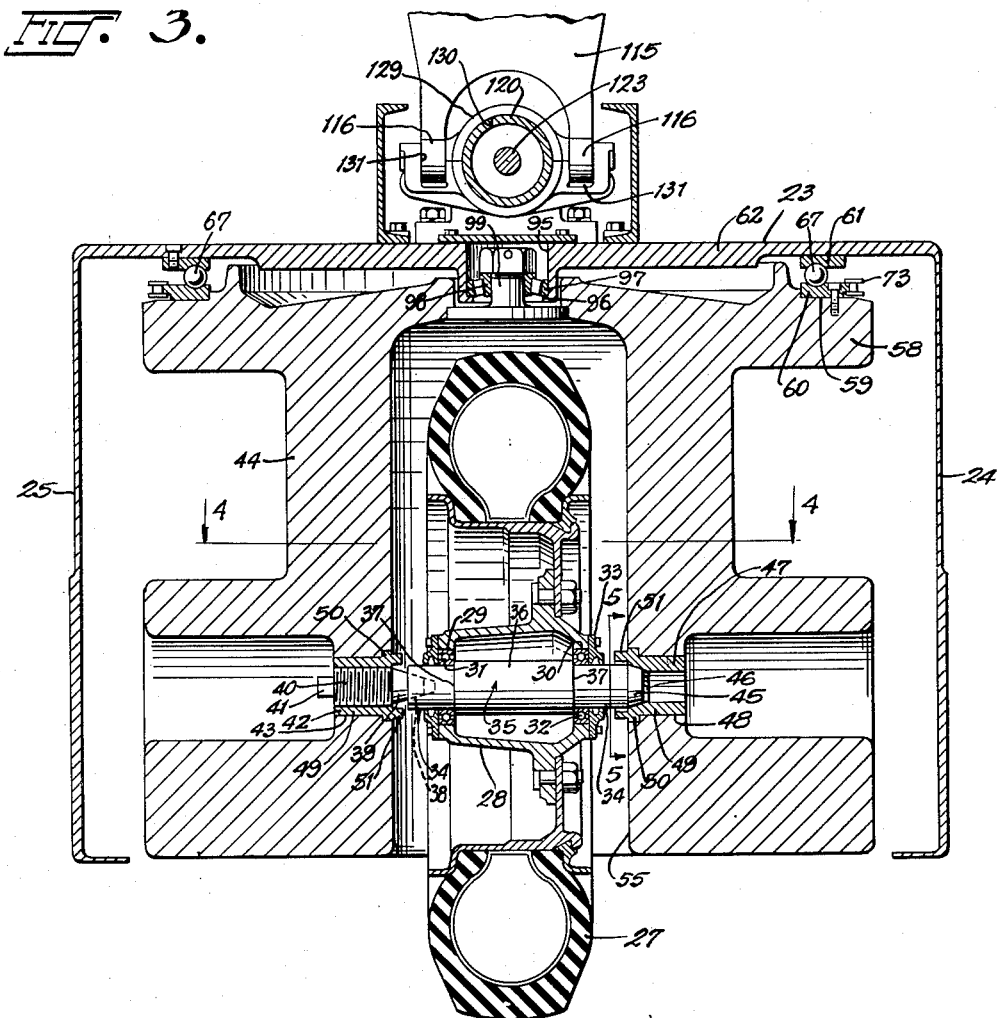
Fig. 3 is a vertical sectional view taken through the steering wheel structure on the plane of the line 3—3 of Fig. 2 looking in the direction of the arrows.

The industrial truck forming the subject-matter of the present invention is preferably of the type having its chassis 20 provided with a pair of driven wheels 21, 22 located at the forward end of the truck. The chassis is covered by a housing 23 (Fig. 3) which is shown as being made of cast metal but which may also be built of a channeled frame and sheet metal plates.

The truck housing 23 may be substantially rectangular in plan except at the rear end. The side walls 24 and 25 join with a partially cylindrical wall 26 to form a tapered end portion of the housing for enclosing the rear steering wheel.

The rear steering wheel 27 is provided with a hub 28 having a pair of aligned bores 29 and 30 for receiving the anti-friction ball bearings 31, 32. The bearings are retained in place by bearing plates 33 secured to the hub by suitable bolts, the bearing plates having apertures for passing the reduced end portions 34 of the axle or shaft 35.

The axle 35 has a larger central cylindrical portion 36 and an annular shoulder 37 at each end of the cylindrical portion engaging the inner race of each anti-friction bearing.

The reduced cylindrical portion 34 of the axle 35 at the left end may be provided with a frusto-conical bore 38 for engaging a complementary frusto-conical surface 39 on the threaded member 40 which has a non-circular portion 41 for engagement with a wrench or other tool.

The threaded member 40 is threadedly mounted in the threaded bushing 42 which is fixedly secured in the bore 43 in the wheel supporting member 44. The other reduced portion 34 of shaft 35 may have a tapered or frusto-conical portion 45 complementary to the inner frusto-conical bore 46 in the bushing 47 that is fixedly mounted in bore 48 on the other side of the wheel supporting member 44.

The bushings 42 and 47 each have outer cylindrical portions 49 for frictional engagement in the bores 43 or 48 in the wheel supporting member 44 and each is preferably provided with an annular flange 50 for engaging in the complementary recess and taking the thrust which is placed upon these bushings.

Figure 5:
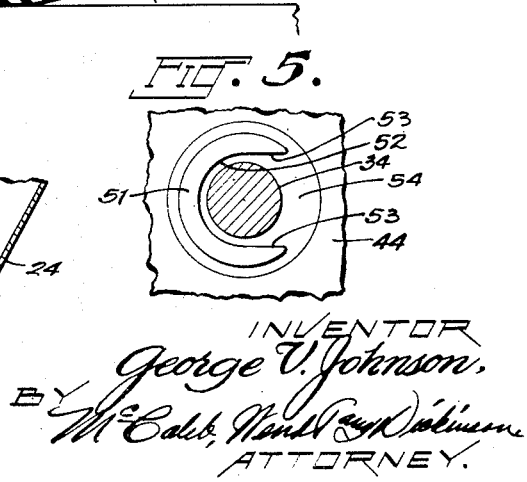
Fig. 5 is a fragmentary sectional view taken on the plane of the line 5—5 of Fig. 3 looking in the direction of the arrows.

Each bushing preferably has a partially annular and axially extending guide flange 51 (Fig. 5), the inner surface 52 of which may be half cylindrical terminating in the straight side wall portions 53 above and below and leaving an opening at 54 through which the axle 35 may be moved out of the bushing flanges 51 in the horizontal direction. The size of the cylindrical recess 52 in the partially annular flange 51 is sufficient to receive the reduced end portion 34 of the shaft.

The over-all length of the shaft 35 is such that when the threaded member 40 is retracted out of the frusto-conical bore 38, the shaft 35 may be moved to the left until it engages in the recess 52 of the bushing 42 and its right end will then be able to clear the inner end of the bushing 47 so that the shaft can pass out through the two openings 54 carrying the wheel with it.

Figure 4:
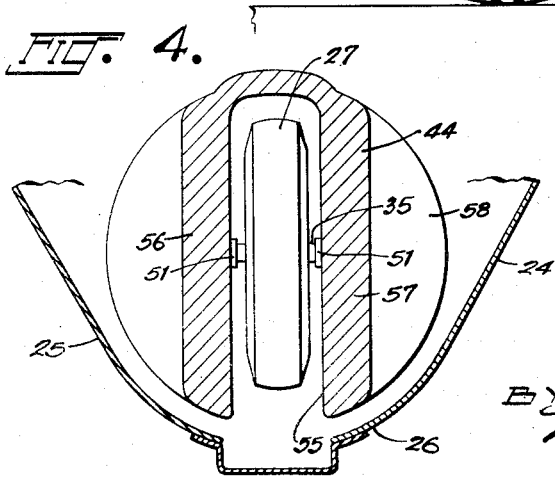
Fig. 4 is a horizontal sectional view taken on the plane of the line 4—4 of Fig. 3 looking in the direction of the arrows.

When it is desired to remove the wheel, it is only necessary to place a jack under the wheel supporting member 44 to relieve the weight on the wheel and thereafter the threaded member 40 may be retracted by means of a socket wrench until its end clears the end of the shaft 35 when the shaft is moved into the bushing recess 52 of bushing 42. The wheel and shaft can then be moved out toward the rear of the vehicle by virtue of the opening 55 between the two side portions 56 and 57 of the wheel supporting member 44 (Fig. 4).

When the wheel is placed back, its shaft will be guided into proper position by the partially annular flange portion 51, and it may be moved toward the right to secure its right end by having the frusto-conical portion 45 engage in the frusto-conical bore 46. Then the left end may be secured by driving the threaded member 40 home with its frusto-conical portion 39 in the frusto-conical bore 38. The shaft is automatically centered and positively secured in place by the centering action of the frusto-conical surfaces and the thrust that is placed on it endwise by the threaded member 40.

In order that no other counterweight may be necessary, the wheel supporting member 44 is preferably made of cast metal, and is purposely made with its side portions 56, 57 thick and heavy to provide the necessary weight.

At its upper end the wheel supporting member 44 preferably has an outwardly projecting thick circular flange 58 having a plane circular track 59 for receiving the lower race 60 of an anti-friction bearing. The upper race 61 is secured to the housing 23, being carried by the upper wall 62 of the housing, and the races are secured to their respective supports by screw bolts or other suitable fastening means.

Figure 9:
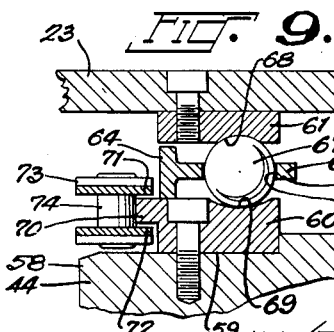
Fig. 9 is a fragmentary vertical sectional view on a larger scale showing one of the ball bearings and the cage and races whereby the steering wheel frame is given additional support against tilting movement at the top.

A suitable annular cage 63 (Fig. 9) is preferably provided, the cage being substantially T-shaped in cross section, having a vertically extending flange 64 and a horizontally extending flange 65. The vertically extending flange has a clearance between the two races, but its lower edge rests on the lower race 60, and the horizontally extending flange is provided with a plurality of apertures 66 for receiving the balls 67.

The apertures 66 are suitably located so that the balls are located in the race grooves 68 and 69. The lower race may be provided with a laterally extending annular flange 70 for engagement between the side flanges 71, 72 of a chain 73. The annular flange 70 has no sprocket teeth, but has a cylindrical surface engaging the rollers 74 of the chain 73, the ends of the chain being anchored at 75 and 76 on the wheel supporting member 44 adjacent the flange 70.

Chain 73 is of the sprocket type, and at a point intermediate its ends it passes about the sprocket 77, the teeth of which are engaged by the chain, and an idler 78 may be provided for taking up the slack in the chain.

Figure 7:
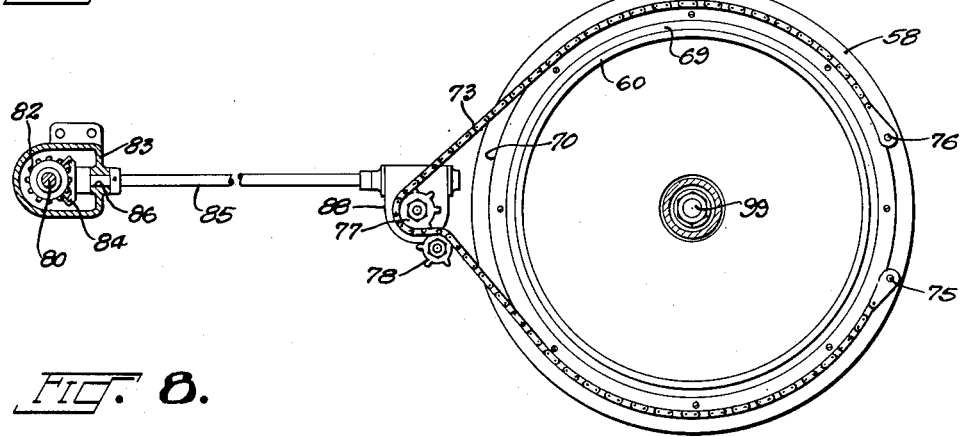
Fig. 7 is a horizontal sectional view showing the steering mechanism and its connection to the steering post.

The steering mechanism for the rear wheel preferably comprises the steering wheel 79 (Fig. 1) fixedly mounted upon a shaft 80 (Fig. 7), which is rotatably mounted in a steering column 81. The shaft 80 carries a bevel gear 82 at its lower end in the housing 83 engaging another bevel gear 84 carried by the horizontal shaft 85, which is rotatably mounted in the bearing 86 of housing 83, the housing being filled with suitable lubricant.

Figure 8:
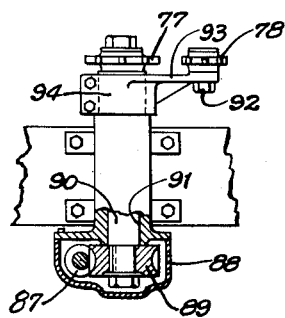
Fig. 8 is a fragmentary elevational view in partial section showing the worm gear and worm and the sprocket for driving the steering wheel.

Shaft 85 carries at its opposite end a worm 87 inserted in the worm gear housing 88 (Fig. 8), the worm engaging a worm gear 89 carried by vertical shaft 90.

Vertical shaft 90 is rotatably mounted in a bearing 91 and provided at its upper end with the sprocket 77, which drives the chain 73. The idler 78 is rotatably mounted on a pin or bolt 92 carried by an arm 93, which is clamped on the bearing member 91 by means of a clamping collar 94.

The housing 23 for the rear wheel has its upper wall 62 provided with a centrally located bore 95, having an inwardly extending annular flange 96 at its lower end. An anti-friction bearing, preferably of the roller type, has its outer race 97 in the bore 95 engaging the flange 96, and its inner race 98 is carried by an upwardly extending stub shaft 99 carried by the wheel supporting member 44.

It should be understood that all of the disclosures of anti-friction bearings are more or less diagrammatic, and the anti-friction bearings are of conventional types.

Thus, the wheel supporting member 44 is rotatably mounted on the stub shaft 99 at its upper center, but it is given lateral support on the housing 23 by means of the ball bearings 67, 61, 60, which are located at a considerable distance from the axis of the shaft 99.

Any tendency for the housing to tilt on the steering wheel is resisted by these balls and races, which are located at a point spaced from the center of rotation of the steering wheel on its vertical axis, and the stability of the truck is greatly increased by this arrangement and by the construction shown, giving maximum visibility and less interference when making turns, as compared with the customary design of stationary counterweights.

The heavy weight of the wheel supporting member 44 eliminates any necessity for any additional counterbalancing weights, and the counterweight serves the purpose of providing support for the steering wheel. The counterbalancing weight is located in a low position, and the center of gravity of the truck is kept relatively low. This design also enables the rear end to be made tapered and rounded so that the truck may be used in many tight places, where it could not otherwise be used.

The industrial trucks of the class described are provided with an upwardly extending telescoping load supporting frame 100, comprising a pair of sections, such as the lower section 101 and the upper section 102. The lower section 101 is pivotally mounted on the chassis at 103 so that the load supporting frame 100 extends in a generally vertical direction, but it may be tilted forward or backward.

Movably mounted on the load supporting frame 100 is a load supporting member 104, which is provided with a pair of tapered load supporting arms 105, 106. The load supporting member 104 may be moved upward or downward on the load supporting member 100 and is slidably mounted on the sections 101 and 102.

The load supporting frame 100 may be tilted forward to cause the ends of the arms 105, 106 to pass under a load and the frame may be tilted backward to cause the load to rest against the rear wall of the load supporting member 104 and to so place the center of gravity of the load that the load will not pass off the front ends of the arm 105, 106 by sliding or rolling.

In order to effect a tilting movement of the load supporting frame 100 and to control its movements, the frame 100 is preferably pivotally connected at 107 on each side to an actuating member 108 having its other end connected to a hydraulically actuated piston 109.

The actuating member 108 may consist of a substantially rectangular frame comprising a pair of side members 110, 111 joined by transverse members 112, 113. At its rear end the rectangular frame 108 extends diagonally downward as indicated at 114 and the two side portions 114 are joined together by a central yoke 115. The yoke 115 has bearing flanges 116 each of which receives a pin 117, 118 (Fig. 6).

The length of the diagonal portions 114 and the location of the forward pivotal connection 107 on the frame 100 is such that the actuating member 108 extends over the head of the operator who may be located on the seat 119. The actuating member 108 may comprise an integral cast metal member or it may be built up out of channeled sections, welded or riveted together, and it may also serve to support a guard in the form of a screen of expanded metal, welded or otherwise secured to the frame members 110—114 on their upper sides.

The pivotal connection of the actuating member 108 to the load supporting frame 100 is preferably at the upper end of the lower section 101 so that the extensible or telescoping section 102 may be operated without interference.

Figure 6:
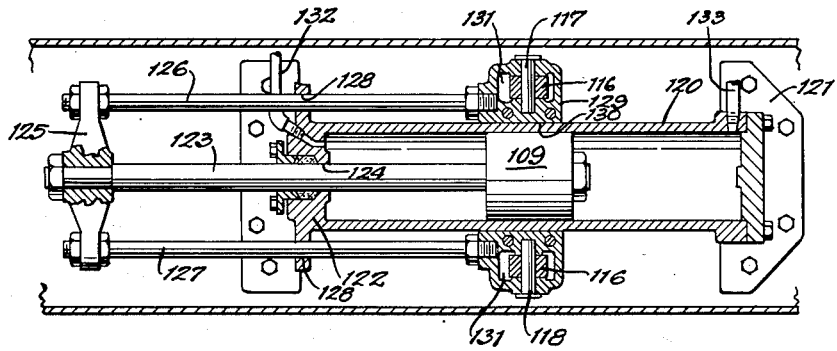
Fig. 6 is a fragmentary sectional view taken on the plane of the line 6—6 of Fig. 1 looking in the direction of the arrows, showing the hydraulic actuating mechanism.

Referring to Figs. 3 and 6, the piston 109 is slidably mounted in a cylinder 120, which is carried by end members 121 and 122. The piston 109, which is merely shown diagrammatically, is connected to a piston rod 123, slidably mounted in a sealed aperture 124 in the end wall 122 of the cylinder 120 so that the piston is double acting.

Piston rod 123 has its reduced end portion fixedly secured to a cross head 125, each end of which carries another actuating rod 126, 127, the rods being slidably mounted in guides 128. Rods are fixedly secured to a sliding collar 129, which has a cylindrical bore 130 for slidably engaging the cylindrical outer surface of the cylinder 120. Thus, the wall 120 serves as a guide for the collar 129.

Collar 129 has upper apertures 131 for receiving the bearing flanges 116, and the pins 117, 118 pivotally mount these bearing flanges on the collar 129.

The vehicle is preferably provided with an internal combustion motor mounted crosswise for driving the front wheels 21 through the usual clutch, special transmission, and differential; and the motor also drives a compression pump, which is supplied with hydraulic fluid from a reservoir, as shown in my prior application.

The hydraulic fluid is controlled by a two-way valve, and may be directed toward either end of the cylinder 120 through the pipes 132, 133 so as to drive the piston 109 in either direction.

The operation of the tilting mechanism for the load supporting frame is as follows: When the two-way valve is moved in one direction, that is, preferably in a forward direction, the piston 109 is moved forward, the actuating member 108 is moved forward, and the frame 100 is tilted forward.

When the valve is held in an intermediate position, the piston is held in an intermediate position with all valves closed. When the two-way valve is moved backward, liquid is admitted to the front part of the cylinder 120 to move the piston 109 backward with the actuating member 108 and to tilt the frame 100 backward.

As the actuating member for the tilting frame is connected to the upper part of the frame on both sides, the frame is firmly held at all times against any tilting or twisting or swaying and this is particularly so even though the load supporting member 104 and arms 105, 106 carry a load to the upper end of the upper telescoping section 102.

The connection of the actuating member for the tilting frame to the upper end of the lower frame section greatly increases the stability of the load supporting arrangement and the actuation of this member by direct connection to a hydraulic piston, eliminates the necessity for a plurality of parts used in my prior application.

The counterbalance for the present truck is utilized for supporting the steering wheel and for effecting a counterbalance with a low center of gravity. The steering wheel may be quickly and easily removed and replaced and all parts of the present mechanism are readily accessible for repair or replacement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an industrial truck, the combination of a chassis with a load supporting frame, said load supporting frame being pivotally mounted on said chassis adjacent one end of such chassis and at the lower end of said load supporting frame, said load supporting frame having a laterally projecting load supporting means for engagement under a load, and means for tilting said load supporting frame comprising a hydraulic cylinder and piston, said piston being directly connected to said load supporting frame by a rigid connecting member pivotally connected to said piston and frame, said load supporting frame having a lower section and an extensible section and said pivotal connection to said frame being at the upper end of said lower section.

2. In an industrial truck the combination of a chassis with a load supporting frame pivotally connected to said chassis at one end of the chassis and at the lower end of said frame, said load supporting frame extending upwardly from said chassis, and an overhead actuating member for said load supporting frame, said overhead actuating member being pivotally connected to an upper part of said load supporting frame and extending over the operator and downwardly behind the operator and controllable power means for driving said actuating member whereby the supporting frame may be tilted forward to take on or discharge a load and tilted backward to retain a load, said power means comprising a hydraulic cylinder and piston, said cylinder being mounted adjacent the other end of said chassis, and means for connecting the piston to said actuating member.

3. In an industrial truck the combination of a chassis with a load supporting frame pivotally connected to said chassis at one end of the chassis and at the lower end of said frame, said load supporting frame extending upwardly from said chassis, an overhead actuating member for said load supporting frame, said overhead actuating member being pivotally connected to an upper part of said load supporting frame and extending over the operator and downwardly behind the operator, controllable power means for driving said actuating member whereby the supporting frame may be tilted forward to take on or discharge a load and tilted backward to retain a load, said power means comprising a hydraulic cylinder and piston carried by the other end of said chassis, said piston being connected to a cross head slidably mounted on the outside of said cylinder, and means for connecting said cross head to said actuating member.

4. In an industrial truck the combination of a chassis with a load supporting frame pivotally connected to said chassis at one end of the chassis and at the lower end of said frame, said load supporting frame extending upwardly from said chassis, an overhead actuating member for said load supporting frame, said overhead actuating member being pivotally connected to an upper part of said load supporting frame and extending over the operator and downwardly behind the operator, controllable power means for driving said actuating member whereby the supporting frame may be tilted forward to take on or discharge a load and tilted backward to retain a load, said power means comprising a hydraulic cylinder and piston carried by the other end of said chassis, said piston being connected to a cross head slidably mounted on the outside of said cylinder, and means for connecting said cross head to said actuating member, comprising pivot pins located on the opposite sides of said cross head and located symmetrically with respect to said actuating member.

5. In an industrial truck, the combination of a chassis with a pair of driven wheels located at its front end and a load supporting frame movably mounted on the front end of said chassis and having load engaging means for engaging under a load with a dirigible wheel located at the rear end of said truck, said dirigible wheel being carried by a shaft and a wheel supporting member of sufficient weight to serve as a counterbalance for a predetermined load on said load engaging means, said shaft and said wheel supporting member being provided on each side of the wheel with complementary frusto-conical centering and holding surfaces whereby the wheel shaft is centered in the wheel supporting member.

6. In an industrial truck, the combination of a chassis with a pair of driven wheels located at its front end and a load supporting frame movably mounted on the front end of said chassis and having load engaging means for engaging under a load with a dirigible wheel located at the rear end of said truck, said dirigible wheel being carried by a shaft and a wheel supporting member of sufficient weight to serve as a counterbalance for a predetermined load on said load engaging means, said shaft and said wheel supporting member being provided on each side of the wheel with complementary frusto-conical centering and holding surfaces whereby the wheel shaft is centered in the wheel supporting member, including threaded means for moving the shaft and wheel axially to bring said frusto-conical surfaces into centering and holding engagement with each other.

7. In an industrial truck, the combination of a chassis with a pair of driven wheels located at its front end and a load supporting frame movably mounted on the front end of said chassis and having load engaging means for engaging under a load with a dirigible wheel located at the rear end of said truck, said dirigible wheel being carried by a shaft and a wheel supporting member of sufficient weight to serve as a counterbalance for a predetermined load on said load engaging means, said shaft and said wheel supporting member being provided on each side of the wheel with complementary frusto-conical centering and holding surfaces whereby the wheel shaft is centered in the wheel supporting member, including threaded means for moving the shaft and wheel axially to bring said frusto-conical surfaces into centering and holding engagement with each other, and guide means carried by said wheel supporting member for guiding the shaft into approximate axial position to be engaged by said threaded means.

8. In an industrial truck comprising a chassis driven by a plurality of wheels located at its front end and a load supporting frame mounted on the front end of said chassis, a dirigible wheel located at the rear of said chassis with walls defining a space within which said dirigible wheel is turned, and a counterweight mounted on said wheel and occupying said space.

9. In an industrial truck, the combination of a chassis having a pair of wheels located at its front end and having a load-supporting frame mounted on its front end beyond the axis of rotation of said wheels, a dirigible wheel carried by the chassis and located at the rear of said chassis, said dirigible wheel being mounted in a recessed wheel-supporting member, said wheel-supporting member being mounted for rotation on a vertical axis, said wheel-supporting member also including a counter-weight carried by said wheel and occupying space at each side of said wheel within which the dirigible wheel-supporting member is rotatable on said vertical axis, said counter-weight being adapted to counter-balance a predetermined load on said load-supporting frame.

10. In an industrial truck, the combination of a chassis having a pair of wheels located at its front end and having a load-supporting frame mounted on its front end beyond the axis of rotation of said wheels, a dirigible wheel carried by the chassis and located at the rear of said chassis, said dirigible wheel being mounted in a recessed wheel-supporting member, said wheel-supporting member being mounted for rotation on a vertical axis, said wheel-supporting member also including a counter-weight carried by said wheel and occupying space at each side of said wheel within which the dirigible wheel-supporting member is rotatable on said vertical axis, said counter-weight being adapted to counter-balance a predetermined load on said load-supporting frame, said truck also having a source of driving power comprising an engine carried with its shaft extending transversely of the chassis forwardly of said dirigible wheel.

11. In an industrial truck, the combination of a chassis having a pair of wheels located at its front end and having a load-supporting frame mounted on its front end beyond the axis of rotation of said wheels, a dirigible wheel carried by the chassis and located at the rear of said chassis, said dirigible wheel being mounted in a recessed wheel-supporting member, said wheel-supporting member being mounted for rotation on a vertical axis, said wheel-supporting member also including a counter-weight carried by said wheel and occupying space at each side of said wheel within which the dirigible wheel-supporting member is rotatable on said vertical axis, said counterweight being adapted to counter-balance a predetermined load on said load-supporting frame, said truck also having a source of driving power comprising an engine carried with its shaft extending transversely of the chassis forwardly of said dirigible wheel, said load-supporting frame being slidably mounted upon a tiltable frame carried by the front end of said truck.

12. In an industrial truck, the combination of a chassis having a pair of wheels located at its front end and having a load-supporting frame mounted on its front end beyond the axis of rotation of said wheels, a dirigible wheel carried by the chassis and located at the rear of said chassis, said dirigible wheel being mounted in a recessed wheel-supporting member, said wheel-supporting member being mounted for rotation on a vertical axis, said wheel-supporting member also including a counter-weight carried by said wheel and occupying space at each side of said wheel within which the dirigible wheel-supporting member is rotatable on said vertical axis, said counterweight being adapted to counter-balance a predetermined load on said load-supporting frame, said truck also having a source of driving power comprising an engine carried with its shaft extending transversely of the chassis forwardly of said dirigible wheel, said load-supporting frame being slidably mounted upon a tiltable frame carried by the front end of said truck, an overhead actuating member connected to the upper end of said tiltable frame and extending rearwardly over the operator and downwardly to the chassis above said dirigible wheel.

13. In an industrial truck, the combination of a chassis having a pair of wheels located at its front end and having a load-supporting frame mounted on its front end beyond the axis of rotation of said wheels, a dirigible wheel carried by the chassis and located at the rear of said chassis, said dirigible wheel being mounted in a recessed wheel-supporting member, said wheel-supporting member being mounted for rotation on a vertical axis, said wheel-supporting member also including a counter-weight carried by said wheel and occupying space at each side of said wheel within which the dirigible wheel-supporting member is rotatable on said vertical axis, said counterweight being adapted to counter-balance a predetermined load on said load-supporting frame, said truck also having a source of driving power comprising an engine carried with its shaft extending transversely of the chassis forwardly of said dirigible wheel, said load-supporting frame being slidably mounted upon a tiltable frame carried by the front end of said truck, an overhead actuating member connected to the upper end of said tiltable frame and extending rearwardly over the operator and downwardly to the chassis above said dirigible wheel, and hydraulic means directly connected to the other end of said actuating member and to said chassis for tilting said tiltable frame.

14. A dirigible wheel-supporting member for an industrial truck, comprising a metal member having means at its upper end for supporting said member for rotation about a predetermined axis for dirigibility of a wheel carried by said member, said member having a centrally located recess adapted to receive a truck wheel provided with a pneumatic tire, a truck wheel assembly in said recess, said truck wheel being carried by a shaft of such proportions that the shaft can be moved laterally out of said recess with the wheel, and means carried by said member at the opposite sides of said recess for engaging said shaft and supporting it in said member.

15. A dirigible wheel-supporting member for an industrial truck, comprising a metal member having means at its upper end for supporting said member for rotation about a predetermined axis for dirigibility of a wheel carried by said member, said member having a centrally located recess adapted to receive a truck wheel provided with a pneumatic tire, a truck wheel assembly in said recess, said truck wheel being carried by a shaft of such proportions that the shaft can be moved laterally out of said recess with the wheel, and means carried by said member at the opposite sides of said recess for engaging said shaft and supporting it in said member, said member having on each of the sides of said wheel counter-weight portions utilizing substantially the space within which the wheel is adapted to be turned for dirigibility.

16. A dirigible wheel-supporting member for an industrial truck, comprising a metal member having means at its upper end for supporting said member for rotation about a predetermined axis for dirigibility of a wheel carried by said member, said member having a centrally located recess adapted to receive a truck wheel provided with a pneumatic tire, a truck wheel assembly in said recess, said truck wheel being carried by a shaft of such proportions that the shaft can be moved laterally out of said recess with the wheel, and means carried by said member at the opposite sides of said recess for engaging said shaft and supporting it in said member, said latter means comprising a fitting having a centering recess for one end of the shaft, and a threaded member engaging the other of the shaft and driving it into said fitting.

17. In an industrial truck, the combination of a chassis with a movably mounted load-supporting frame pivotally supported on said truck at the lower end of said frame, said load-supporting frame having a laterally projecting load-supporting means for engagement under a load, a rigid connecting member pivotally connected to said frame at the upper end of said frame and extending backwardly of said truck, the other end of said rigid connecting member being directly connected to a piston mounted in a hydraulic cylinder for tilting said load-supporting frame to any of a plurality of predetermined angular positions.

18. In an industrial truck, the combination of a chassis with a movably mounted load-supporting frame pivotally supported on said truck at the lower end of said frame, said load-supporting frame having a laterally projecting load-supporting means for engagement under a load, a rigid connecting member pivotally connected to said frame at the upper end of said frame and extending backwardly of said truck, the other end of said rigid connecting member being directly connected to a piston mounted in a hydraulic cylinder for tilting said load-supporting frame to any of a plurality of predetermined angular positions, said rigid connecting member comprising a horizontally extending frame located over the head of the operator of the truck and adapted to protect the operator from falling objects.

19. A dirigible wheel-supporting member for an industrial truck, comprising a metal member having means at its upper end for supporting said member for rotation about a predetermined axis for dirigibility of a wheel carried by said member, said member having a centrally located recess adapted to receive a truck wheel provided with a pneumatic tire, a truck wheel assembly in said recess, said truck wheel being carried by a shaft of such proportions that the shaft can be moved laterally out of said recess with the wheel, and means carried by said member at the opposite sides of said recess for engaging said shaft and supporting it in said member, said load-supporting frame having a lower section and an extensible section, said extensible section carrying said latter projecting load-supporting means.

20. A dirigible wheel-supporting member for an industrial truck, comprising a metal member having means at its upper end for supporting said member for rotation about a predetermined axis for dirigibility of a wheel carried by said member, said member having a centrally located recess adapted to receive a truck wheel provided with a pneumatic tire, a truck wheel assembly in said recess, said truck wheel being carried by a shaft of such proportions that the shaft can be moved laterally out of said recess with the wheel, and means carried by said member at the opposite sides of said recess for engaging said shaft and supporting it in said member, said load-supporting frame having a lower section and an extensible section, said extensible section carrying said latter projecting load-supporting means, a pair of wheels supporting said chassis rearwardly of said load-supporting frame, and a dirigible wheel located at the rear end of said chassis, and a counter-weight carried by said dirigible wheel and utilizing the space within which said dirigible wheel is adapted to turn.

GEORGE V. JOHNSON.